United States Patent
Funtò et al.

(10) Patent No.: US 8,266,585 B2
(45) Date of Patent: Sep. 11, 2012

(54) ASSISTING A SOFTWARE DEVELOPER IN CREATING SOURCE CODE FOR A COMPUTER PROGRAM

(75) Inventors: Andrea Funtò, Rome (IT); Emmanuele Tordelli, Rome (IT)

(73) Assignee: International Business Machines Corporation, Armonk, NY (US)

(*) Notice: Subject to any disclaimer, the term of this patent is extended or adjusted under 35 U.S.C. 154(b) by 1125 days.

(21) Appl. No.: 12/097,353

(22) PCT Filed: Oct. 27, 2006

(86) PCT No.: PCT/EP2006/067871
§ 371 (c)(1),
(2), (4) Date: Jun. 13, 2008

(87) PCT Pub. No.: WO2007/068527
PCT Pub. Date: Jun. 21, 2007

(65) Prior Publication Data
US 2008/0320438 A1 Dec. 25, 2008

(30) Foreign Application Priority Data
Dec. 15, 2005 (EP) .................................. 05112242

(51) Int. Cl.
*G06F 9/44* (2006.01)
(52) U.S. Cl. ......... 717/109; 717/106; 717/110; 717/113
(58) Field of Classification Search .................. None
See application file for complete search history.

(56) References Cited

U.S. PATENT DOCUMENTS

| | | | |
|---|---|---|---|
| 6,314,559 B1 | 11/2001 | Sollich | |
| 6,965,990 B2 * | 11/2005 | Barsness et al. | 713/1 |
| 2002/0133752 A1 * | 9/2002 | Hand | 714/38 |
| 2003/0079199 A1 * | 4/2003 | Barsness et al. | 717/100 |
| 2004/0153995 A1 * | 8/2004 | Polonovski | 717/113 |
| 2004/0243977 A1 | 12/2004 | Shou et al. | |

(Continued)

OTHER PUBLICATIONS

Mandelin, D. et al. Jungloid Mining: Helping to Navigate the API Jungle. Proceedings of the 2005 ACM SIGPLAN Conference on Programming Language Design and Implementation. Jun. 12-15, 2005. pp. 48-61. [retrieved on Nov. 17, 2011]. Retrieved from the Internet: <URL: www.cs.berkeley.edu/~bodik/research/pldi05-prospector.pdf>.*

(Continued)

*Primary Examiner* — Tuan Q Dam
*Assistant Examiner* — Geoffrey St Leger
(74) *Attorney, Agent, or Firm* — Yee & Associates, P.C.; Jeffrey S. LaBaw

(57) ABSTRACT

In a software development system, a method for assisting a user in creating source code for a computer program in a high-level programming language. The method comprises: at a current user inputting location within a piece of source code under development, detecting a need for assisting the user with input for the creation of the piece of source code under development; determining fitting source code elements suitable for input at said current inputting location; and providing, e.g. displaying to the user said list of fitting source code elements, wherein, in order to determine the fitting source code elements, for each fitting source code element a respective fitting probability of the source code element in the current inputting location is determined, and wherein the user is provided with the list of fitting source code elements by associating to each fitting source code element in the list an indication of the respective fitting probability.

15 Claims, 7 Drawing Sheets

U.S. PATENT DOCUMENTS

| | | | |
|---|---|---|---|
| 2005/0015747 A1* | 1/2005 | Zatloukal et al. | 717/109 |
| 2005/0125773 A1* | 6/2005 | Hawley et al. | 717/109 |
| 2006/0026559 A1* | 2/2006 | Gunturi et al. | 717/110 |
| 2007/0038978 A1* | 2/2007 | Meijer et al. | 717/106 |

OTHER PUBLICATIONS

Wiegand, J. et al., Eclipse: A platform for integrating development tools, IBM Systems Journal, vol. 43, No. 2, 2004, pp. 371-383, [retrieved on Apr. 25, 2012], Retrieved from the Internet: <URL:http://www.ics.uci.edu/~ses/teaching/inf219/desrivieres wiegand.pdf>.*

Church, L., Introducing #Dasher, A continuous gesture IDE, A work in progress paper, 17th Workshop of the Psychology of Programming Interest Group, Sussex University, Jun. 2005, 15 pages, [retrieved on Apr. 25, 2012], Retrieved from the Internet: <URL: http://citeseerx.ist.psu.edu/index>.*

* cited by examiner

FIG. 3A

|   | O::O | O::M1 | O::M2 | O::~O |
|---|------|-------|-------|-------|
| O::O | N/A | 0.85 | 0.15 | 0 |
| O::M1 | N/A | 0.05 | 0.75 | 0.20 |
| O::M2 | N/A | 0.25 | 0.10 | 0.65 |
| O::~O | N/A | N/A | N/A | N/A |

|   | A1 O::O | A1 O::M11 | A1 O::M1h | ... | A1 O::~O | ... | Am O::O | ... | Am O::Mm1 | Am O::Mmn | Am O::~O |
|---|---|---|---|---|---|---|---|---|---|---|---|
| A1 - O::O | N/A | P(O→M11) | P(O→M1h) | ... | ... | ... | ... | ... | ... | ... | ... |
| A1 - O::M1h | N/A | P(M11→M11) | P(M11→M1h) | ... | ... | ... | ... | ... | P(M1h→Mm1) | P(M1h→Mmn) | 0 |
| A1 - O::~O | N/A | N/A | N/A | ... | N/A | ... | N/A | ... | | | 0.20 |
| ... | ... | ... | ... | ... | ... | ... | ... | ... | ... | ... | ... |
| Am - O::O | | | | | N/A | ... | N/A | ... | | | N/A |
| Am - O::Mm1 | P(Mm1→M11) | | | | N/A | ... | N/A | ... | 0.15 | | |
| Am - O::Mmn | P(Mmn→M11) | | | | | ... | | ... | 0.75 | | |
| A1 - O::~O | | | | | N/A | ... | N/A | ... | N/A | N/A | N/A |

```
public static void main(String args[])
{
    String methodName = "main";
    long totalSuccess = 0L;
    long totalFailure = 0L;
    File traceFile = new File("PutResultStress_trace
    Trace.setTraceFile(traceFile);
    Trace.traceEntry("PutResultStress.main()");
    int nparms = Array.getLength(args);
    if(nparms != 5)
    {
        System.out.println("usage:\tjava PutResultSt
        System.out.println("\t<server_name>\t\tthe nam
        System.out.println("\t<root_dir>\t\tthe root_d
        System.out.println("\t<applicationID>\t\tthe a
        System.out.println("\t<output_files>\t\tthe di
        System.out.println("\t<num_of_threads>\t\tthe nu
        System.out.println("hello there");
        System.out.p┌────────┬──────────────┐nt_parms++];
        System.exi│package │public        │parms++];
    }           │put     │packimports   │ount_parms++];
    int count_parm│public  │println       │unt_parms++];
    String server_│put     │parseInt      │[count_parms++]);
    String junctio│packimpor│             │
    String root_di│private  │             │ + server_name);
    String applica│println  │             │ + root_dir);
    String output_│parseInt │             │
    int n = Intege└────────┴──────────────┘
    Trace.trace(3, "server_name = " + server_name);
    Trace.trace(3, "root_dir = " + root_dir);
```

FIG. 5A

ASSISTING A SOFTWARE DEVELOPER IN CREATING SOURCE CODE FOR A COMPUTER PROGRAM

TECHNICAL FIELD

The present invention generally relates to the field of electronic data processing, and more specifically to methods and systems for creating source code for computer programs. More particularly, the invention concerns methods and systems for assisting software developers, i.e. programmers in the task of creating new computer program source code.

BACKGROUND ART

Computer programs are as known the sets of instructions that are passed to computers and that, when executed, direct the computer operation, so as to perform the desired tasks.

The programs that are passed to and that can be directly executed by the computers are in the so-called "machine code", which is a sequence of binary digits, i.e. ones and zeroes that are hardly meaningful to humans. In order to make the task of writing and reading, e.g. for maintaining computer programs easier, not only for the writers, so-called "high-level" programming languages have been created, which allow to express data structures and algorithms in a way closer to human language, thereby resulting less difficult to be read and understood. Very popular high-level languages are for example the Pascal, the C, the C++, the Basic, the Java, just to cite a few.

In particular, most of the modern high-level programming languages, like for example the C++ and the Java, are based on the concepts of "object-oriented" programming.

The programmer, using for example a text editor, writes the so-called "source code" program, which is a listing of expressions, statements, declarations, instructions etc. in one of the available high-level languages. Once the source code writing is terminated, a compiler program translates the source code into machine language, and then a linker program performs the final operations necessary to obtain an executable (".exe") program which is directly executable by the computer. In some cases, like for example the Basic case, a runtime interpreter program is provided that interprets the programmer instructions during the execution thereof.

Software tools providing an Integrated software Development Environment (IDE) are known; these tools provide a programming environment integrated into an application that makes available to the software developer, in addition to a textual source code editor, a graphic code builder, with which the programmer can interact through a Graphical User Interface (GUI), a source code compiler, a linker, possibly an interpreter, and a debugger; examples of IDE tools are Visual Studio, Delphi, Jbuilder, FrontPage, DreamWeaver, just to cite a few; another commercially known software design tool is Rational Rose by IBM Corporation, which is an object-oriented Unified Modelling Language (UML) software design tool intended for visual modelling and component construction of software applications. Another graphical software design tool is LabView.

Most IDE tools implement a so-called "code-completion" feature, that assists the software developers in the task of writing source code by prompting the programmer with suggestions as to how to complete expressions or statements being written. For example, after the programmer types in, in a source code editor, the name of a function or a method, the code-completion feature may display to the programmer an alphabetically-ordered list of all possible arguments for that method or function, from which the programmer may choose the desired one; even more, when the code-completion feature understands that there is only one possible way to complete an expression typed in by the programmer, it may directly inscribe the remaining piece of code necessary to complete the expression.

For example, U.S. Pat. No. 6,314,559 describes a visual development system having a code editor with code completion feature for displaying context sensitive pop-up windows within a source code file. Code completion is implemented at the user interface level, by displaying a code completion dialog box after the user enters a record or class name followed by a period. For a class, the dialog box lists the properties, methods and events appropriate for that class. For a record or structure, the dialog box lists the data members of the record. To complete entry of the expression, the user needs only select an item from the dialog list, whereupon the system automatically enters the selected item in the code. Code completion also operates during input of assignment statements: when the user enters an assignment statement for a variable and presses a hot key (e.g., the combination <ctrl><space_bar>), a list of arguments valid for that variable is displayed; the user can simply select an argument to be entered in the code; similarly, the user can bring up a list of arguments when typing in a procedure, function, or method call and needs to add an argument: in this manner, the user can view the required arguments for a method as he/she enters a method, function, or procedure call.

Code completion is also addressed in US 2005/0015747.

SUMMARY OF THE INVENTION

The Applicant has observed that the way in which code completion is currently implemented in the known IDEs/software development tools, albeit providing a big help to the software developer, could nevertheless be improved. Indeed, the list of choices that the known code completion functions show to the programmer for completing an expression is usually sorted in alphabetically order; in this way, the programmer is merely provided a mnemonic aid, in order to facilitate remembering the names of the various software elements; in other words, the aid provided is essentially no more than that of a reference list printed on a paper sheet, to which the programmer refers for not having to remember all the names.

The Applicant has found that it would instead be far better if the code completion function listed the possible choices not merely sorted alphabetically, rather in a more reasoned way, particularly following an affinity criterion among source code elements, whereby source code items that best fit in the specific source code context, particularly source code items that are more affine to source code items already typed in by the developer, are listed first.

According to an aspect of the present invention, a method as set forth in appended claim 1 is provided for, adapted to be used in a software development system for assisting a user in creating source code for a computer program in a high-level programming language.

The method comprises:
  at a current user inputting location within a piece of source code under development, detecting a need for assisting the user with input for the creation of the piece of source code module under development;
  determining fitting source code elements suitable for input at said current inputting location; and
  providing to the user said list of fitting source code elements, wherein said determining the fitting source code elements includes determining for each fitting source code element a respective fitting probability of the source code element in the current inputting location,
and wherein said providing to the user said list of fitting source code elements includes associating to each fitting source code element in the list an indication of the respective fitting probability.

Other aspects of the invention include a system comprising means for carrying out the steps of the method, and a computer program adapted to implement the method when executed on a computer.

According to another aspect of the present invention, a method for assisting a user in creating source code for a computer program in a high-level programming language is provided, comprising:

receiving a piece of source code module developed by a user and including a first sequence of source code elements;

analysing the piece of source code module; as a result of said analysing, determine at least one alternative source code implementation including a second sequence of source code elements; and suggesting to the user the at least one alternative source code implementation;

wherein said analysing includes:

comparing a statistical probability of the first sequence of source code elements to a statistical probability of the second sequence of source code elements, wherein said probabilities are based on a statistical analysis of previously created pieces of source code modules.

According to still another aspect of the present invention, a method of establishing a semantical affinity among predetermined source code elements adapted to be used for the creation of source code computer programs is provided, as set forth in appended claim 14, the method comprising:

taking a population of source code computer programs which include the source code elements;

performing a statistical analysis the source code programs of said population, wherein said performing the statistical analysis includes calculating, for each source code element, a statistical probability that the source code element follows a preceding list of at least one of the predetermined source code elements.

BRIEF DESCRIPTION OF THE DRAWINGS

The features and advantages of the present invention will be best understood reading the following detailed description of some embodiments thereof, description that will be conducted making reference to the accompanying drawings, wherein:

FIG. 3A schematically shows, in tabular form just for purposes of illustration, a semantical affinity matrix describing the affinity between methods of a generic class of an object-oriented high-level programming language, in an embodiment of the present invention;

FIG. 3B is a graph providing an alternative representation of the semantical affinity between methods of FIG. 3A;

FIG. 3C schematically shows, in tabular form similar to that of FIG. 3A, a generalisation of the semantical affinity matrix to the case of m classes, each one exposing own methods;

FIGS. 5A and 5B pictorially show screen shots illustrating two examples of code completion dialog boxes displayed to the programmer by the software development tool.

DETAILED DESCRIPTION OF THE PREFERRED EMBODIMENT(S)

Figure 1:
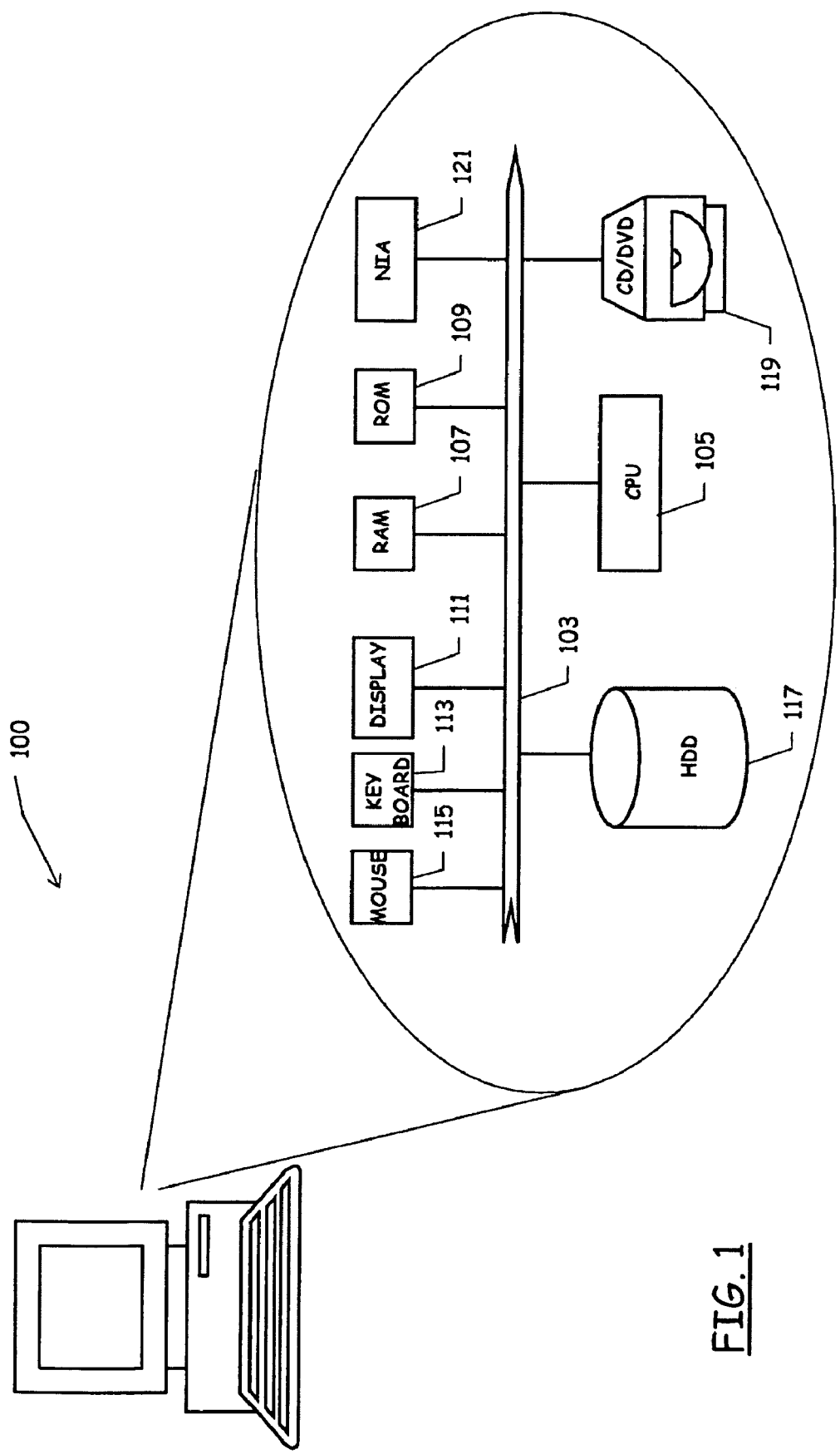
FIG. 1 schematically shows, in terms of functional blocks, the main components of a generic computer wherein a method according to an embodiment of the present invention can be implemented.

With reference to the drawings, in FIG. 1 a generic computer 100, for example a Personal Computer (PC) or a workstation, includes several functional units connected in parallel to a data communication bus 103 (for example a PCI bus). In particular, a Central Processing Unit (CPU) 105, typically comprising a microprocessor (possibly, a plurality of co-operating microprocessors, depending on the processing performances), controls the operation of the computer, a working memory 107, typically a RAM (Random Access Memory) is directly exploited by the CPU 105 for the execution of programs and for temporary storage of data, and a Read Only Memory (ROM) 109 is used for the non-volatile storage of data, and stores for example a basic program for the bootstrap of the computer. The computer comprises several peripheral units, connected to the bus 103 by means of respective interfaces. Particularly, peripheral units that allow the interaction with a human user are provided, such as a display device 111 (for example a CRT, an LCD or a plasma monitor), a keyboard 113 and a pointing device 115 (for example a mouse). The computer also includes peripheral units for local mass-storage of programs (operating system, application programs) and data, such as one or more magnetic Hard-Disk Drivers (HDD), globally indicated as 117, driving magnetic hard disks, a CD-ROM/DVD driver 119, or a CD-ROM/DVD juke-box, for reading/writing CD-ROMs/DVDs. Other peripheral units may be present, such as a floppy-disk driver for reading/writing floppy disks, a memory card reader for reading/writing memory cards, a Universal Serial Bus (USB) adapter with one or more USB ports, printers and the like. The computer may be further equipped with a Network Interface Adapter (NIA) card 121 for the connection to a data communication network (not shown in the drawing), such as for example a Local Area Network (LAN). The computer 100 may further comprise a MODEM, a wireless communication interface card like a Wi-Fi or a Bluetooth card (not explicitly depicted in the drawing).

Hereinafter, the computer 100 is assumed to be exploited by a software developer for creating new source code for a computer program, using a generic one of the known high-level programming languages, for example one of the well-known high-level languages listed in the foregoing. To this purpose, it is for example assumed that an IDE tool is installed on the computer 100; the IDE tool includes for example a source code textual editor, and it may also include a visual source code editor, a source code compiler, a linker. The programs are installed on the computer's hard disk, and, when launched, are at least partially loaded in the computer working memory 107.

Figure 2:
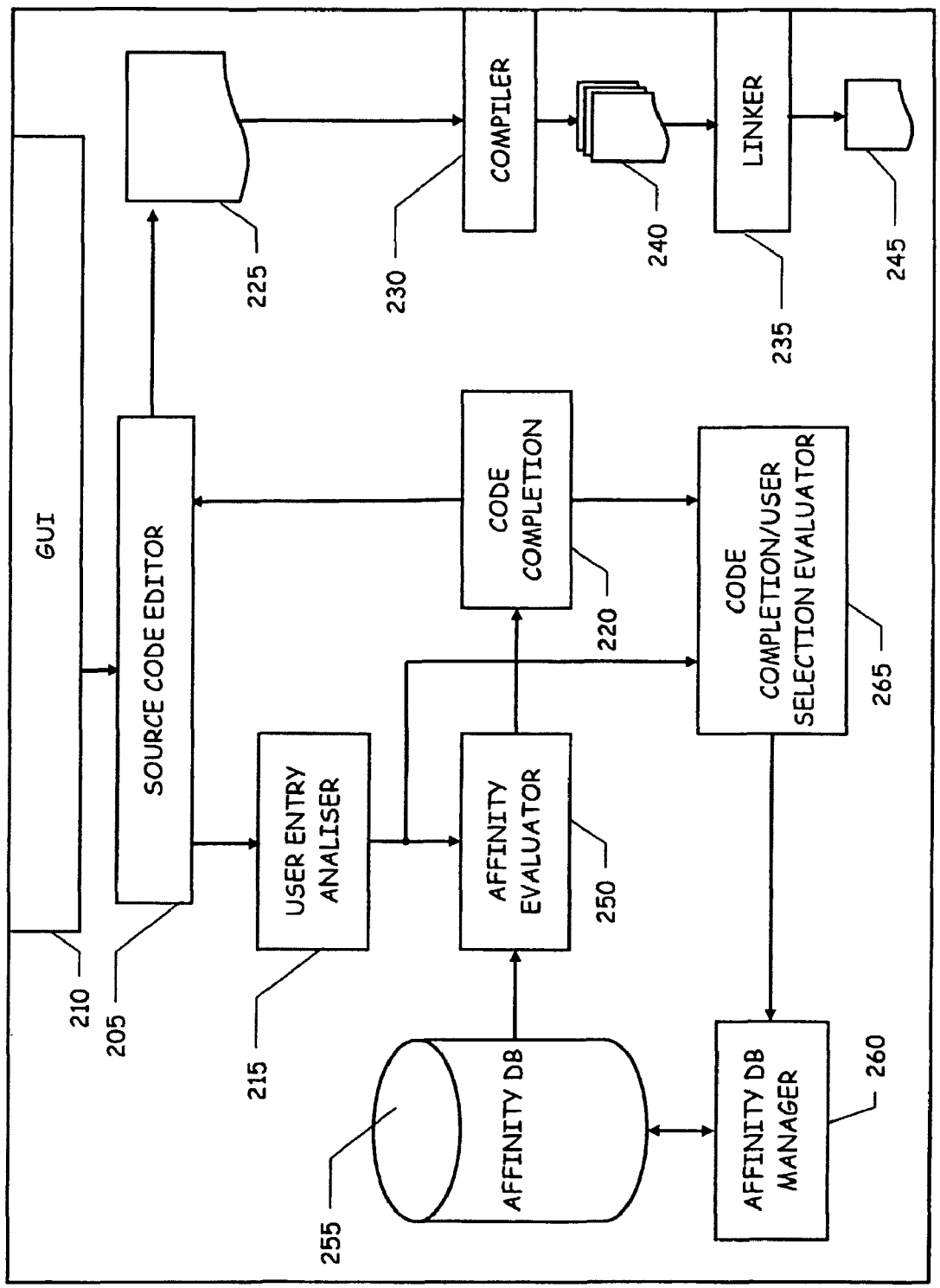
FIG. 2 shows, in terms of functional blocks, a partial content of a working memory of the computer of FIG. 1, when executing a software development tool adapted to implement a predictive code completion method according to an embodiment of the present invention.

FIG. 2 schematically depicts a partial content of the computer working memory 107 while executing an IDE application featuring a code completion functionality according to an embodiment of the present invention. In the drawing, some components like for example a computer operating system are not explicitly shown, albeit they are intended to be present.

The IDE application includes a source code editor 205, for example, albeit not limitatively, a textual editor; using the source code editor, and a GUI 210, allowing interaction with the programmer via the input devices and the display device, the programmer creates the source code, typing in the desired expressions, in the considered high-level programming language, for example Java or C++.

A user entry analyser module 215 is adapted to analyse user entries in the source code editor 205, i.e. the expressions that the user types in using the source code editor 205. A code completion module 220 implements a code completion functionality, that assists the software developer in the writing of source code, by prompting suggestions as to how to complete expressions or statements typed in through the source code editor 205.

The source code editor 205 generates a file 225 with the computer program source code. A compiler module 230 compiles the source code file 225, obtaining an object file; a linker module 235 links together the object files 240, thereby obtaining the computer program 245, in executable machine language.

Conventionally, the code completion functionality is implemented in such a way that the list of choices displayed to the programmer as possibilities for completing an expression, e.g. after the programmer types in a label of a source code element like a software object, followed by a method invocation operator (like ".", ",", "->", depending on the specific high-level programming language) is sorted in alphabetical order; in this way, the programmer is provided with a mnemonic aid that facilitates remembering the names of the various source code elements, without the need to continuously jumping fro and back between the source code text editing window and an on-line help window or reference manual.

According to an embodiment of the present invention, differently from known implementations of the code completion function, the code completion module 220 is adapted to list the possible available choices following an affinity criterion, whereby source code items that are semantically more affine to items of source code already typed in by the software developer, i.e. that best fit in the actual context, are given higher priority and are listed first in a dialog box displayed to the programmer.

The Applicant has in fact observed that it is possible to establish an affinity between source code elements; in particular, this insight derived from the Applicant observation of how, in object-oriented programming languages, software objects interact, analysing the objects lifecycle.

In general, software objects within source code programs in object-oriented programming languages like Java or C++ have a lifecycle that starts with the object instantiation (hereinafter, the object constructor method that is invoked for instantiating the object is denoted O::O) and ends with a call to the object's destructions (the object destructor method is hereinafter denoted O::~O); in particular, in the case of stack objects, the object destruction occurs implicitly, as soon as the objects goes out of scope, whereas in the case of objects created on the heap, the object destruction is explicit (new O( )).

Apart from those cases where heap objects are not released (destructed) because of programming errors (memory leaks), every object that is instantiated in a certain program, sooner or later within the program gets also destructed. Thus, the probability that the destructor method O::~O for a given object O will be called in the same source code program where the corresponding object constructor method O::~O has been called is 1. This is true in general for all objects, as well as within objects, in any given source code program (in an object-oriented language).

An object constructor method O::O and an object destructor method O::~O are not different from any other method O::Mi that can be invoked on the object O; the only additional constraint on the constructor O::O and destructor O::~O methods is that the destructor method O::~O is invoked if and only if the constructor method O::O has been previously called. This is a constraint that only applies to the invocation of the methods O::O and O::~O on a single object O instance.

In normal, well behaving computer programs, objects are instantiated because the programmer wants to invoke object methods and have them accomplish some task they are designed for before the objects get destructed; thus, between an invocation of the object constructor method O::O (i.e., an instantiation of the object) and the invocation of the object destructor method O::~O, one or more other object methods may be called.

Merely for the sake of explanation, the following code fragments show the definitions (in C++) of the necessary classes, and an example of the typical lifecycle of a Socket object on a network server machine and on a client thereof.

---
Definition of the Socket class
---

```
#ifndef_SOCKET_H_
#define_SOCKET_H_
#include <NetworkAddress.h>
#include <String.h>
class Socket
{
    public:
        Socket( );
        virtual ~Socket( );
        // Two forms of the same method!
        bool Bind(const NetworkAddress & addr);
        bool Bind(const String & hostname, unsigned short port);
        //
        // Client side operations (2 forms!)
        //
        bool Connect(const NetworkAddress & server);
        bool Connect(const String & hostname, unsigned short port);
        //
        // Server side operations
        //
        bool Listen( );
        bool Accept(Socket & established);
        //
        // Common operations
        //
        bool Send(byte * buffer, unsigned long & buffersize);
        bool Receive(byte * buffer, unsigned long & buffersize);
        bool Close(unsigned long mode = CLOSE_BOTH);
        static const unsigned long CLOSE_SEND = 0x00000001;
        static const unsigned long CLOSE_RECV = 0x00000002;
        static const unsigned long CLOSE_BOTH = CLOSE_SEND |
            CLOSE_RECV;
    private:
        int socket_;
```

-continued

```
};
#endif //_SOCKET_H_
------------------------------------------------------------
------------------------------------------------------------
Definition of the NetworkAddress class
------------------------------------------------------------
#ifndef_NETWORKADDRESS_H_
#define_NETWORKADDRESS_H_
#include <String.h>
class NetworkAddress
{
    public:
        NetworkAddress(const String & hostname, unsigned short port);
        virtual ~NetworkAddress( );
        const String & GetHostname( ) const { return hostname_; }
        unsigned short GetPort( ) const { return port_; }
    private:
        String hostname_;
        Unsigned short port_;
};
#endif //_NETWORKADDRESS_H_
------------------------------------------------------------
```

On a typical computer network server, an instance of the Socket class is created, and it is bound to one of the server network interfaces, and to a specific port thereof; the Socket object is then put in listen state, and the main loop would block on an Accept method invocation, waiting for an incoming connection; as soon as a new connection is established, the connected socket is returned as a side effect of the Accept method invocation, and it can be used to communicate with the client; hereinbelow a simple server-side code fragment, and a simple client-side code fragment are reported (the fragments are again in C++; error and return codes are omitted, for the sake of simplicity):

```
------------------------------------------------------------
Server-side code fragment
------------------------------------------------------------
#include <NetworkAddress.h>
#include <Socket.h>
int main(int argc, char * argv[ ])
{
    Socket listener = Socket( );
    NetworkAddress local = NetworkAddress("localhost", 8888);
    listener.Bind(local);
    listener.Listen( );
    while(true)
    {
        Socket established = Socket( );
        listener.Accept(established);
        unsigned short size = 13;
        established.Send("hallo, world!", size);
        established.Close( );
    }
    return 0;
}
------------------------------------------------------------
------------------------------------------------------------
Client-side code fragment
------------------------------------------------------------
#include <NetworkAddress.h>
#include <Socket.h>
#include <iostream>
int main(int argc, char * argv[ ])
{
    Socket connection = Socket( );
    NetworkAddress local = NetworkAddress("localhost", 8887);
    NetworkAddress remote = NetworkAddress(argv[1], 8888);
    connection.Bind(local);
    connection.Connect(remote);
    byte buffer[1024];
    unsigned short size = 1024;
    Connection.Receive(buffer, size);
    Buffer[size] = 0;
    cout << "Received: " << reinterpret_cast<char *>(buffer) << endl;
    return 0;
}
------------------------------------------------------------
```

The above code fragments show some characteristics of the objects that are instantiations of the Socket class:

1. the objects may (this happens on the client side, and, on the server side, it is true for the listening Socket object) or may not (like the "established" Socket object on the server side) be bound to a local interface and port before being used; nevertheless, they most frequently are;
2. there are certain method invocation sequences that most likely occur in the same sequence (e.g. the method Accept( ) is always called after an invocation to the method Listen( ); the methods Send( ) and Receive( ) are always called on connected/accepted Sockets; the method Close( ) may be called before destroying the Socket object, it may be part of the ~Socket( ) destructor itself, or it may be called with CLOSE_RECV after having read the last data from the Socket, or with CLOSE_SEND right after having sent the last data on a socket, such as in typical connection shutdown sequences, like in the HTTP—Hyper Text Transfer Protocol);
3. the invocation sequences may even span multiple methods: a statistical analysis conducted by the Applicant of server side code has revealed that once the Bind( ), Listen( ) and Accept( ) methods have been called on a Socket object, in 85% of the cases the next call is to the method Receive( ), and only in 15% of the cases a method Send( ) is called.

The Applicant has observed that well-defined chronological sequences of method invocations as those shown in the above example occur frequently, mostly when the operations that can be performed on an object has to follow relatively strict guidelines, and the steps should be performed in a predetermined way.

Thus, semantical affinity exists among methods.

The Applicant has also found that not only affinity exists between methods of a same class (inter-object affinity), but even among objects, and respective methods, of different classes (intra-object affinity). For example, referring to the code fragments reported above, it can be appreciated that the Socket objects are very often used in conjunction with NetworkAddress objects; this is in some way implied by the Socket method definitions, and by the compiler's include directives in the Socket class definition, but it also stems from a statistical analysis on a population including a sufficiently large number of source code programs making use of computer network connections.

Another example of the semantical affinity among different objects is provided by objects of the classes Thread and ThreadRunnable, defined hereinbelow (still in C++ language).

```
------------------------------------------------------------
Definition of class Thread
------------------------------------------------------------
#ifndef_THREAD_H_
#define_THREAD_H_
#include <ThreadRunnable.h>
class Thread
{
```

```
    public:
        Thread(ThreadRunnable & runnable) : runnable_(runnable){ }
        virtual ~ Thread( );
        bool Start( );
        bool Pause( );
        bool Resume( );
        // This method waits for a set of threads to complete
        // before returning to the caller
        static bool Wait(Thread * thread[ ], int number);
    private:
        ThreadRunnable & runnable_;
};
#endif //_THREAD_H_
--------------------------------------------------------------
--------------------------------------------------------------
Definition of class ThreadRunnable
--------------------------------------------------------------
#ifndef_THREADRUNNABLE_H_
#define_THREADRUNNABLE_H_
class ThreadRunnable
{
    public:
        ThreadRunnable( );
        Virtual ~ ThreadRunnable( );
        virtual bool Start( ) = 0; // nuts'n'bolts: pure virtual!
};
#endif //_THREADRUNNABLE_H_
--------------------------------------------------------------
```

The ThreadRunnable class is defined as an abstract class, whose Start( ) method contains the real set of instructions that will be executed within the thread, and needs to be implemented by some extending class, as shown in the code fragment below.

```
--------------------------------------------------------------
Implementation of the abstract class ThreadRunnable
--------------------------------------------------------------
#ifndef_MyTHREADRUNNABLE_H_
#define_MYTHREADRUNNABLE_H_
#include < ThreadRunnable.h>
#include <iostream>
class MyThreadRunnable : public ThreadRunnable
{
    public:
        MyThreadRunnable(int tid) : ThreadRunnable( ) { tid_= tid; }
        virtual ~MyThreadRunnable( );
        virtual bool Start( );
    private:
        int tid_;
};
//
// Also implement Start( ) method here
//
bool MyThreadRunnable::Start( )
{
    for(int i = 0; i < 1000: i++)
    {
        cout << "HALLO from thread number " << tid_<< endl;
    }
    return true;
}
#endif //_MYTHREADRUNNABLE_H_
--------------------------------------------------------------
```

A typical use of these classes is shown in the following code fragment, which relates to system scheduling through objects of the classes Thread and ThreadRunnable.

```
--------------------------------------------------------------
code fragment of a system scheduler
--------------------------------------------------------------
#include <Thread.h>
#include <MyThreadRunnable.h>
int main(int argc, char * argv[ ])
{
    int i = 0;
    ThreadRunnable * tr[10];
    Thread * t[10];
    //
    // Create the new threads
    //
    for(i = 0; i < 10; i++)
    {
        tr[i] = new MyThreadRunnable(i + 1);
        t[i] = new Thread(*(tr[i]));
    }
    //
    // Start the new Threads
    //
    for(i = 0; i < 10; i++)
    {
        t[i].Start( );
    }
    //
    // Wait for Threads to do their job
    //
    Thread.Wait(t, 10);
    //
    // Delete objects
    //
    for(i = 0; i < 10; i++)
    {
        delete(t[i]);
        delete(tr[i]);
    }
    return 0;
}
--------------------------------------------------------------
```

The above example shows that:
1. the instantiation of the classes ThreadRunnable and Thread always proceeds according to a given sequence: an object of the class ThreadRunnable must be created first, and then a reference thereto can be passed to the Thread object constructor;
2. the class ThreadRunnable is a pure virtual class, and the sample code fragment uses the extending class MyThreadRunnable in place thereof; however, through inheritance it is possible to track the MyThreadRunnable class back to the ThreadRunnable class, which has a semantic link to the Thread class;
3. after an object of the Thread class has been created, it will most likely be started, as shown in the example.

The two examples discussed in the foregoing show that semantic affinity among methods and objects do exist, and the affinity can run through the inheritance chain and reach the final implementers of a given virtual class.

Based on the above considerations, the Applicant has found that a concept of semantical affinity among elements of a computer program, particularly a source code can be established, in particular, although not limitatively, between methods of software objects that are instantiations of classes in object-oriented programming languages.

For example, by semantical affinity within a class there is intended the set of implicit or explicit usage sequencing relationships between the methods of the class.

In an embodiment of the present invention, the semantical affinity between two generic source code elements of a computer program is expressed in terms of probability that the two source code elements come together is a source code program, possibly in a certain order: given generic first and second source code elements, e.g. first and second methods (either of a same class or of different classes), the affinity of the second source code element to the first source code element, in the example the affinity of the second method to the first method, may be expressed as the probability (i.e., as a number ranging from 0 to 1) that, after the first source code element has been used (i.e., after the first method has been invoked), the second element is used (i.e., the second method is invoked).

In particular, the semantical affinities of the various source code elements can be calculated, measured by means of a statistical analysis of the occurrences of the source code elements in a sufficiently vast population of already existing pieces of computer program source code.

In particular, in order to measure the semantical affinity among source code elements in the statistical analysis conducted on already existing pieces of source code, and then to determine, in a source code being written, which is the source code element most likely to be used in a current position, the size of an observation window adopted to perform the statistical analysis of the source code may vary; for example, in the exemplary case of method invocations, the number of prior method invocation statements used to establish the probability of the invocation of a given method at a certain position in a source code may vary from just the immediately preceding method invocation statement (e.g., in the previous line in the source code listing) to two or more previous method invocation statements. More generally, an observation window including a variable number of previous source code lines may be used to evaluate the probability that a certain source code elements is to be used next. The size of the observation window determines the order of the semantical affinity criterion adopted: for example, in order to calculate the semantical affinity of order N among methods, N previous method invocation statements are analysed to determine how likely it is that the next method to be invoked is a certain method instead of another.

For example, in performing the statistical analysis of already existing pieces of source code to determine the semantical affinities, the sequence of method invocations may be analysed without taking into account the details of what specific program language construct wherein the methods are invoked; for example, a method invocation instruction that within a loop is regarded as a single method invocation, i.e. as a single instruction (in other words, loops are not unrolled into a linear sequence of instructions, and each method invocation instruction in a loop is considered as a single method invocation, albeit in the execution of the program it will be repeated a number of times equal to the number of iterations of the loop).

For example, let the case be considered of a class O exposing two methods O::M1 and O::M2, in addition to the constructor O::O and destructor O::~O methods; the first-order semantical affinity among the methods of the class O can be schematised by a two-dimensional matrix, like that depicted in FIG. 3A, with a number of rows and columns equal to the number of exposed methods, and wherein the generic matrix element Pij represents the probability that the generic method O::Mj is invoked right after the invocation of the method O::Mi. In other words, the rows of the matrix represent the methods that have just been invoked on an object of the class O, whereas the columns represent the methods whose probability of invocation right after the method just invoked is being evaluated (it is pointed out that the opposite convention may be adopted). Looking at FIG. 3A, if an object has been created using the constructor method O::O, the first row of the matrix shows that, statistically, the probability that the destructor method O::~O will be invoked right thereafter is 0, the probability that the method O::M1 will be invoked next is 85%, and that of invoking the method O::M2 is 15%. Assuming that the most probable method O::M1 has actually been called after the object creation, the second row of the matrix shows that it is very likely (75%) that the next method to be invoked on the object will be the method O::M2, and there is a slight probability (20%) that the object will be destructed (O::~O); it is instead very unlikely (5%) that method O::M1 will be called again on the object. Assuming that the most probable method O::M2 has actually been called after the invocation of the method O::M1, the third row of the matrix shows that it is likely (65%) that the object will be next destructed, while there are slight probabilities (25% and 10%) that the methods O::M1 and, respectively, O::M2 will be invoked. It is observed that the sum of the probability values on each row has to be 1 if, as in the exemplary case presented, the methods exposed by the objects of the class O do not have any semantic interaction with methods exposed by objects of other classes, otherwise the sum may be less than 1, because the flow of control may in such a case escape towards other objects, of other classes. Also, the sum of the probability values of all the possible paths from the constructor method O::O to the destructor method O::~O must be 1 (under the assumption of no intra-class semantic interaction) or less (in the case of an intra-class semantic interaction.

It is observed that in case a higher-order semantical affinity criterion is adopted, the set of probability values may form an (N+1)-dimensional matrix, where N is the semantical affinity order.

FIG. 3B provides a graphical representation of the matrix of FIG. 3A, in terms of a graph similar to a state-transition diagram. In the drawing, the method invocations are depicted as the nodes of the graph, i.e. as states, an arrow from a first state to a second state represents a possible invocation of the method corresponding to the second state after the invocation of the method corresponding to the first state. To each transition, a probability value is assigned, giving the affinity between the two methods. It can be appreciated that the states representing the constructor and destructor methods are just entry and, respectively, exit points, whereas the states representing the other methods have arrows entering thereinto and leaving therefrom.

Whenever, according to the probability values in the matrix, transition loops are possible (e.g., the table above allows for the O M1 M2 M1 M2 M1 M2 ... ~O and O M1 M1 M1 ... ~O invocation sequences), the sum of the probabilities can be expressed as the sum of a set of geometrical series of ratio $\wp M1<1$, thus converging to a finite number:

$$OM_1M_1M_1 \ldots M_1 \sim O = \wp_O \cdot \sum_{n=1}^{\infty} (\wp_{M_1})^n \cdot \wp_{\sim O} = \wp_O \cdot \left( \frac{\wp_{M_1}}{1 - \wp_{M_1}} \right) \cdot \wp_{\sim O}$$

It should be observed that the sum in the previous formula starts at 1, not 0. The same expression holds valid for all loop paths in the graph. It can be appreciated that the composite probability of a sequence of method invocations is always less than 1 because it is given by the product of probability elements, each of which is less than 1. The probability of a sequence of N method invocations is less than $P^N$ where M<P<1 and M is the higher transition probability from a generic method to another method belonging to the same class. It is possible to demonstrate that when there are more than one methods belonging to the same class, there exist a number P such that M<P<1. For N that goes to infinity, the sum of the probability of all the possible sequences is a number less the result of a geometrical series converging to a finite number, because P<1. The sum of the probability of all the possible sequences is therefore a finite number. If the composite probability of a sequence of method invocations Pc=(M1M2M3M1 . . . ) converge to zero faster than another average probability Pa, for example given by $(0.5)^N$, then the sequence with probability Pc is an improbable sequence. This may be exploited as an indication of different degrees of affinity of the methods in the two invocation sequences, and a source code editor could notify the software developer that the sequence Pc is improbable. Moreover, since the sum of the probability of all the possible method invocation sequences is a finite number, it is possible to associate to an entire project a value of standardisation, that could be given by sum of the probabilities of all the possible method invocation sequences, divided by the number of methods invoked.

It is observed that despite the composite probabilities of all loop paths in the graph are less than 1, their sum may give a total probability that is higher than 1, and this may happen e.g. if $\wp M1 > 0.5$; this is due to an approximation that is implicit in the adoption of a semantical affinity criterion of order 1, i.e. it depends on the assumption that the method invoked at the generic method invocation step t only depends on the method invoked at step (t−1). In the practice, a programmer has good understanding of essentially the overall instruction flow, and will choose which method to invoke next based on two or more, or even all the methods already invoked on the object; moreover, the probability that the same sequence of methods is invoked over and over (except in a loop, which is not the case under analysis, because, as mentioned above, loops are not unrolled into a flat sequence of instructions) decreases more rapidly than $(\wp M1)^n$, as it is usually expected that repeated invocations of the same methods are very unlikely.

As mentioned in the foregoing, in a computer program paths of execution may take directions that lead outside of the scope of a single class of objects; one such example has been provided above by the Thread and ThreadRunnable classes, where it has been shown that there is a strong affinity between the two classes, especially of the class ThreadRunnable with respect to the class Thread, because instantiating Thread objects is necessary in order for ThreadRunnable objects to be of any use; in some cases, such as for example that of the Java programming language, Thread objects can exist and be used both in conjunction with ThreadRunnable objects and alone: this means that the semantic affinity relationship is not symmetrical. Another example of intra-class affinity is provided by the Socket class, which exhibits affinity with the NetworkAddress class. Also in the case of the Socket class, the semantical affinity relationship is not symmetrical: a Socket object can be bound to a network interface, or connected to a remote host without making use of NetworkAddress objects, by using the alternate form of the methods, using String references and unsigned short integers to represent the connection endpoint.

As in the simpler case of inter-class affinity discussed above, intra-class affinity may be represented as a matrix of probability values. In particular, FIG. 3C shows in tabular form an affinity matrix in respect of m generic classes A1, . . . , Am, respectively exposing methods (M11, . . . , M1h) . . . , (Mm1, . . . , Mmn). The intra-class affinity may as well be represented as a state-transition diagram, similar to that of FIG. 3B (albeit much more complex, with an increased number of nodes in the graph); in this case, the rule of having constructor and destructor methods only as entry and exit points, respectively, is relaxed: for example, the constructor method for a certain object may be invoked after an invocation of a method of another object (like in the Socket class example: the constructor method for instantiating a Socket object will very probably be invoked after the invocation of the constructor method for instantiating the NetworkAddress object; the reciprocal may occur as well, e.g. if the NetworkAddress object may be instantiated right before instantiating the Socket object.

It is pointed out that what stated above in respect of method invocations is not to be construed as limited thereto, but applies in general to sequences of source code elements.

Referring back to FIG. 2, in an embodiment of the present invention the user entry analyser module 215 interacts with an affinity evaluator module 250, which in turn has access to an affinity database 255. The affinity database 255 stores affinity data regarding the semantical affinities among the various source code elements; in particular, the semantical affinity data are expressed as probabilities, as discussed in the foregoing, arranged for example in affinity matrixes. The affinity database 255 may for example be provided by the vendor of the IDE software, who builds it up by performing a statistical analysis of several existing pieces of source code, or the IDE software may have a functionality, for example an affinity database manager utility 260, that enables the user to directly perform the statistical analysis on his/her existing source codes, and to build a personalised affinity database directly on his/her computer. For example, as far as pieces of source code in Java programming language are concerned, an XML (eXtensible Markup Language) file may be created for each class, the XML file containing probability values indicating the probabilities that a generic method is invoked after the invocation of another method of the class.

The affinity evaluator module 250 is adapted to search the affinity database 255 for determining which source code element, for example which method(s) is(are) statistically more likely to be invoked in a current position of the source code being written by the programmer.

The affinity evaluator module 250 communicates to the code completion module 220 a list of more likely source code elements that might fit in the current position of the source code being written, ordered by decreasing affinity (i.e., by decreasing probability values). The code completion module 220 is adapted to receive this list from the affinity evaluator module 250 and to display it to the programmer, with the source code elements ordered by their affinity with the already written source code, i.e. by their statistically-based likelihood of fitting in the current position of the source code being written.

In particular, the affinity database 255 may store semantical affinity data up to a predetermined order, and the affinity evaluator module 250 may be adapted to take into consideration a more or less long sequence of previous instructions in the source code being written, backward from the current position in the source code being written.

A code completion versus user selection evaluator module 265 receives from the user entry analyser module 215 the choice of the programmer (which may differ from the possibilities proposed by the code completion module 220), and, through the affinity database manager module 260, causes the affinity data in the affinity database 255 to be updated in run-time.

Figure 4:
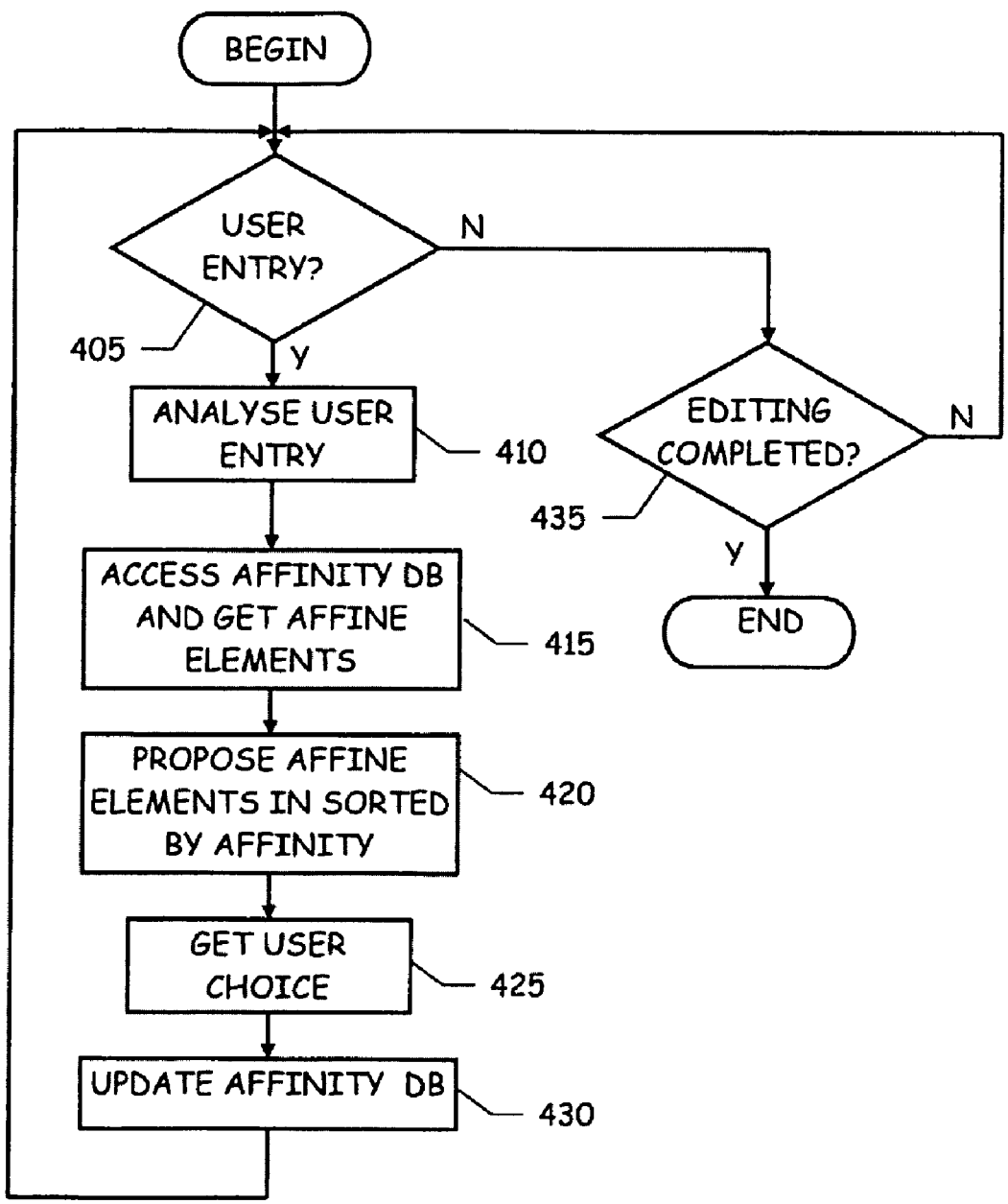
FIG. 4 is a schematic flowchart illustrating some of the steps of a source code editing method according to an embodiment of the present invention.

The operation of the IDE software depicted in FIG. 2 is hereinafter explained, in connection with the simplified flowchart of FIG. 4, wherein some steps of a source code editing method according to an embodiment of the present invention are depicted.

Once the program is started, the programmer, exploiting the source code editor 210, types in expressions, instructions statements, and similar, for writing the desired source code program. The user entry analyser module 215 waits for a user entry; in particular, it may be provided that, in order to trigger the predictive code completion functionality, a particular user entry is required, like for example an entry of an operator symbol after an object label, or the pressure of a predetermined key, like the space bar, or combination of keys, like <ctrl><spacebar>.

When the user entry analyser module detects a user entry (decision block 405, exit branch Y), it analyses the user entry (block 410); the affinity evaluator module 215 is instructed to access the affinity database (block 415); the affinity evaluator module gets affine source code elements (block 420), based on the semantical affinity data (particularly, exploiting the probabilities values) stored in the affinity database 255, and builds a list of source code elements that are more likely to fit in the current point of the source code program being written. The affinity evaluator module passes to the code completion module 220 the list, wherein the different source code elements are preferably ordered by decreasing likelihood, or/and they may be accompanied by an indication of the respective likelihood. The code completion module displays as usual the list of possible choices to the programmer, but in this case the programmer is presented with a list of choices that is ordered by degree of affinity, and/or wherein the different choices are accompanied by an indication, for example visual, of the respective likelihood; thus the programmer knows that, e.g., the first elements in the list are those that most probably fit in the current position of the source code being written.

The code completion versus user selection evaluator module 265 then detects the programmer choice (which may be different from any element in the list presented by the code completion module: the programmer is free to input any source code element he/she want), and, through the affinity database manager, updates the affinity database.

Figure 5B:
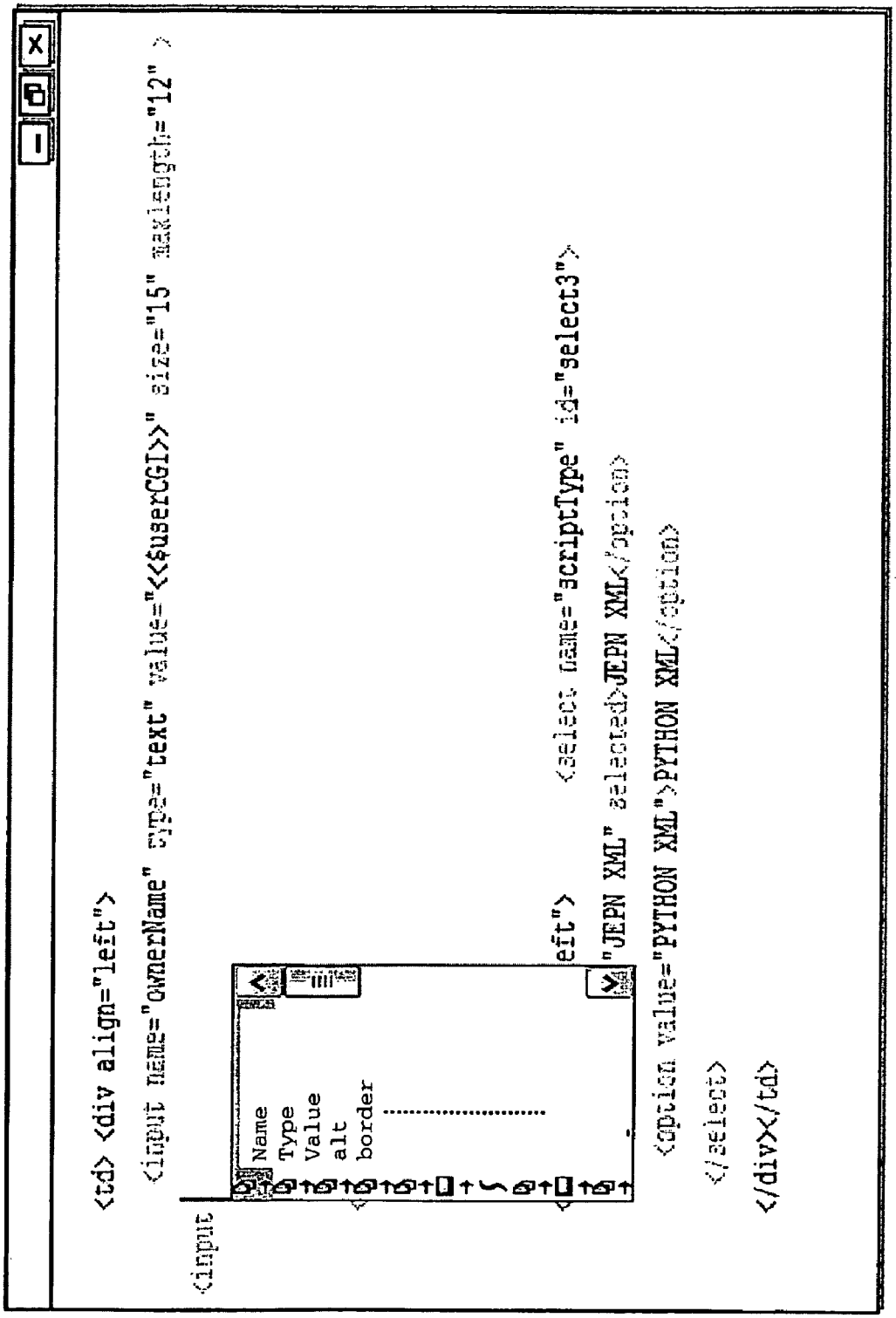

FIGS. 5A and 5B are exemplary screenshots of a hypothetical source code editor window illustrating how a code completion pop-up window lists possible choices for completing an expression not in alphabetical order, but by affinity with the context, according to an embodiment of the present invention.

Referring to the practical source code examples provided in the foregoing, let it be assumed that the software developer, while writing a new piece of source code, instantiates a MyThreadRunnable object. The developer moves to the next source code line and (without typing anything) presses the <ctrl><spacebar> key combination, which is assumed to be the trigger for the code completion functionality. The affinity evaluator module 250 analyses the previous instructions in the source code being written (how many instructions are analysed depends on the order of the semantical affinity implemented), and detects that an object of class MyThreadRunnable, extending the base class (or interface) ThreadRunnable has been created; based on the probability coefficients stored in the affinity database 255, the affinity evaluator module 250 predicts that the most likely method to be invoked next is the Thread constructor; thus, the code completion module 220 provides this choice as the first in a drop down list displayed to the developer, followed by other choices in decreasing order of probability (e.g. the setter methods on the ThreadRunnable object first, the getter methods then, the destructor method last).

Thus, according to the above described embodiment of the present invention, code completion, which may be activated also on empty source code lines, and not only after the software developer enters labels followed by operators (like the '.' and '->' operators), by the pressure of a predetermined keys or combination of keys, is predictive: source code elements are not merely suggested in alphabetical order, rather according to their relative probability. It is pointed out that the predictive code completion function is not limited to the methods of a single class, i.e., it does not involve only already instantiated, existing objects: it may predict creation of new objects.

In the practice, it may occur that some classes have tighter relationships with each other than other classes; in this case, the semantical affinity representation can be simplified by limiting it to a few objects, and respective methods (this means for example that the affinity matrix can be reduced in size). For example, in order to measure semantical affinity among classes, it is possible to evaluate how frequent it is, in already existing source code pieces, that the classes are imported together in different source code files; if a value equal to the number of times the classes are imported together, normalised to the population of considered source code files, exceeds a predetermined threshold, the classes are considered affine, and the degree of affinity corresponds to said value. Alternatively, it could be possible to associate to each source code element, for example to each class, a vector of parameters corresponding to a selected set of properties adapted to describe the classes. Taken two generic classes, the scalar product of the corresponding vectors (a number ranging from 0 to 1) may be taken as the measure of the degree of affinity between the two classes: if the value resulting from the scalar product exceeds a predetermined affinity threshold, the two classes are considered affine (and thus an indication of affinity among the methods exposed by the two classes is included in the affinity database). This considerations may be extended to any source code element.

It is observed that the method according to the described embodiment of the invention provides best results when the relationship between source code elements, i.e. their semantical affinity is strong. There may be source code elements, e.g. objects (such as all the wrapper types for native types, integer, float etc., strings, base classes of a very large hierarchy, such as Object in the Java programming language) that are semantically intertwined with too many classes, and the probability coefficients expressing their affinities would be very small; in these cases, the adoption of the affinity criterion may result not particularly useful, because it is not possible to clearly identify a more probable choice. In such cases, i.e. when a source code element has no marked semantic affinity with other source code elements, meaning for example that it is not possible to determine a "most probable method" with a degree of confidence that exceeds a predetermined "noise" threshold, the conventional, alphabetical code completion mechanism may be used as a fall back choice.

A possible practical implementation of the predictive code completion method described in the foregoing may make use of fuzzy logic concepts, and could be based on neural networks. Fuzzy logic is in fact adapted to provide a fuzzy response to questions like:

"is source code element X going to be the next one?", wherein X is an input pattern; the closer to "true" (i.e., to 1) the answer, the higher the probability that the considered source code element is the next one, and for example the higher the position of the source code element X in the drop-down list displayed to the programmer. Association between input patterns and methods could be based on GUIDs (Globally Unique IDentifiers), the way UML class methods versus Java code methods associations are tracked in Rational XDE today.

For example, in the case of classes, each class could have associated therewith (for example as part of the documentation, but embedded in the class declaration file, whether a '.h' or a '.java', and surrounded by special and standard markers, such as the <predictive>, </predictive> tags within a /* ... */ comment) the values needed to initialise a neural network; these values could be a snapshot obtained by instructing a neural network (analogous to the one that will evaluate the predictive code completion) and freezing the weights of its nodes and links once it has learnt how to behave in what the class developer expects to be the most common usage patterns. The neural network could also be loaded once for a whole set of classes that have tight semantic affinity; this would solve the problem of determining what neural network coefficients should be used when multiple classes are included in a single compilation unit. Neural networks, when properly designed, can also have memory: this can be useful when evaluating method invocations based on a higher-order semantic affinity criterion. Intermediate network status auto-save, restore and re-evaluate (in case the user's choice differs from the suggested method) may be part of the predictive code completion activities.

It is pointed out that the applicability of the present invention is not limited to predictive code completion. Other possible applications of the semantical affinity concept include for example statistical code analysis, analysis of the value of the code, automatic code inspection and prediction of code defects.

In the following, a simple example is provided adapted to clarify how the concept of semantical affinity among source code elements may be exploited for performing an automatic inspection of a piece of source code.

Let it be assumed that, in a database, records include a date field DATE, in U.S. format (i.e., month, day, year) and that a software developer wishes to write a piece of source code for connecting to the database, run a query on the field DATE of the database records, and, for the extracted records, convert the date into European format (day, month, year). Let the following two hypothetical classes be considered: the class DateParse (hereinafter simply identified as A1), exposing the method ConvertDate_US_EP (M1) for date conversion from US to European format, and the class jdbc (hereinafter, A2), for accessing databases, exposing the method ConnectToDB (M2), for connecting to the database, the method SelectDate (M3), for running the selected query on the database once connected thereto, and the method DateConvert_US_IT (M4) that, similarly to the method M1 of class A1, is adapted to perform the date conversion from US to European format.

Let the following two operation sequences be considered:
Sequence A:
  import DateParse
  import jdbc
  jdbc->ConnectToDB
  jdbc->SelectDate
  DateParse->ConvertDate_US_EP
in symbols: A2(M2,M3),A1(M1),
Sequence B:
  import DateParse
  import jdbc
  jdbc->ConnectToDB
  jdbc->SelectDate
  jdbc->DateConvert_US_EP
in symbols: A2(M2,M3,M4).

Let it be assumed that the source code editor has associated therewith a source code analyser utility (like the combination of the previously described user entry analyser module 215 and affinity evaluator module 250) adapted to perform code analysis based on the affinity criterion described in the foregoing. In particular, just by way of example, let it be assumed that, based on statistical analysis of already existing pieces of source code, the sequence B results to be the more likely.

If the software developer writes the code using the sequence A, the source code analyser may read the file with the piece of source code, and determine which classes are imported: if the classes are not considered affine (for example, based on the criteria explained in the foregoing), no further actions are performed, and the sequence of operations written by the software developer is simply retained. If instead the source code analyser detects that the software developer choice is not the statistically more probable sequence, it may advise the software developer to modify the source code in line with sequence B.

Figure 6:
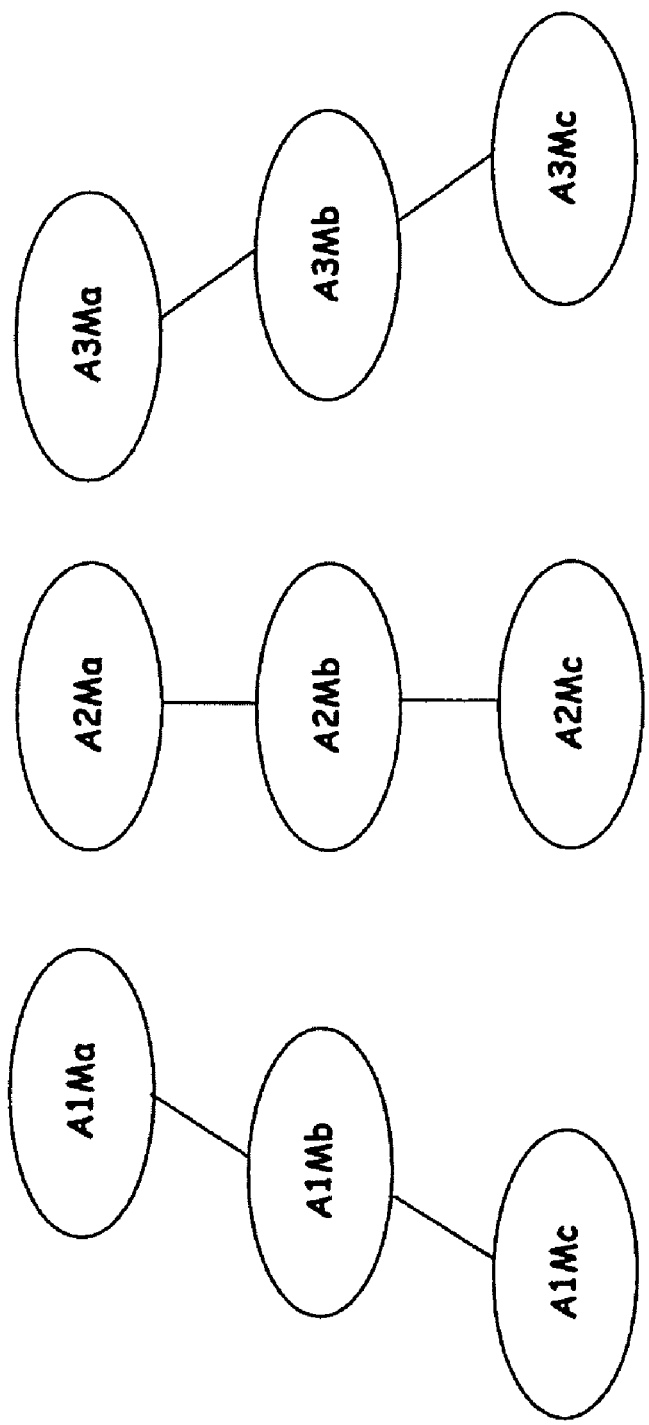
FIG. 6 schematically shows some exemplary classes and methods arranged in tree structure for a source code analysis, according to an alternative embodiment of the present invention.

A way to express the affinity between source code elements, like methods exposed by classes, alternative to the matrix form described in the foregoing, is to build a parse tree structure, wherein each leaf of the tree represents a class, and one of the possible methods, like in the example of FIG. 6, wherein only three classes A1, A2 and A3 are considered, for the sake of simplicity; for example, classes A1 and A2 may be the classes DateParse and jdbc defined in the above example; class A3 is simply another class, different from A1 and A2, but not relevant to the example being described. Ma, Mb and Mc identifies types of methods: for example, method type Ma includes the methods for the connection to databases, like the method ConnectToDB (M2) of class A2, method type Mb includes the methods for performing a generic, specific type of query on the databases, like for example the method Select-Date (M3) of class A2, and method type Mc includes methods for performing date conversion, like the methods ConvertDate_US_EP (M1) of class A1 and DateConvert_US_EP (M4) of class A2.

In the considered example, the tree leafs A1Ma and A1Mb are null, or in other words they relate to non-existing methods, because there are no methods for connection to databases nor for performing queries exposed in the class DateParse. It can also be appreciated that A2Mc and A1Md are similar, in the sense that they are methods adapted to perform similar operations.

The source code analyser reads the source code file with the sequence A written by the software developer; detecting that only classes A1 and A2 are imported, the source code analyser refers to the tree structure ignoring the other classes (in the example, ignoring class A3). Let it be assumed that the source code analyser has been instructed to consider more affine the methods of a same class: thus, the source code analyser takes the class indicator as the primary similitude criterion in exploring the tree. In the considered example, this means that the sequence B above is considered better compared to sequence A. Thus, if the developer wrote sequence A, the source code analyser may suggest to the developer to change the source code into sequence B. If instead the source code analyser has been instructed to consider more affine methods of a same type, but that belong to classes different from the origin class (the class to which the first method instantiated belongs), the primary similitude criterion is the method type indicator. In this case, assuming that the developer wrote the sequence B, the source code analyser checks if methods similar to A2M2 exist, in the other class A1 (the only class imported together with class A2). Since no such method like A1M2 exists, the source code analyser continues to the next statement A2M3: as in the previous case, since no such method as A1M3 exists, the source code analyser goes on to the third statement, A2M4: since in this case a method A1M1 exists that, according to the predefined affinity criterion, is considered more affine, the source code analyser may suggest to the software developer to change the last statement of the sequence, and if the developer accepts, the sequence A is obtained.

Other affinity criteria may be used by the source code analyser for assessing whether a certain source code piece is the best (i.e., the one statistically more probable), or if alternatives exist. For example, as mentioned in the foregoing, the composite probabilities of different possible sequences of source code elements may be calculated and used for assessing which sequence is the best.

The present invention has been disclosed by describing an exemplary embodiment thereof, however those skilled in the art, in order to satisfy contingent needs, will readily devise modifications to the described embodiment, as well as alternative embodiments, without for this reason departing from the protection scope defined in the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of the present description, a computer-usable or computer-readable medium can be any apparatus, device or element that can contain, store, communicate, propagate, or transport the program for use by or in connection with the computer or instruction execution system.

The medium can be an electronic, magnetic, optical, electromagnetic, infrared, or semiconductor storage medium, network or propagation medium. Examples of a storage medium include a semiconductor memory, fixed storage disk, moveable floppy disk, magnetic tape, and an optical disk. Current examples of optical disks include compact disk-read only memory (CD-ROM), compact disk-read/write (CD-R/W) and digital versatile disk (DVD), DASD. Examples of a propagation medium include wires, optical fibers, and wireless transmission.

The invention can be applied in a data processing system having a different architecture or based on equivalent elements; each computer can have another structure or it can be replaced with any data processing entity (such as a PDA, a mobile phone, and the like).

The invention claimed is:

1. In a software development system, a method for assisting a user in creating source code for a computer program in a high-level programming language, the method comprising:
    at a current user inputting location within a piece of said source code under development, detecting a need for assisting the user with input for the creation of the piece of source code;
    determining fitting source code elements suitable for input at said current inputting location; and
    providing to the user said list of fitting source code elements, wherein said determining the fitting source code elements includes determining for each fitting source code element a respective fitting probability of the source code element in the current inputting location, and wherein said providing to the user said list of fitting source code elements includes associating to each fitting source code element in the list an indication of the respective fitting probability, wherein said fitting probabilities include probabilities of software methods of a software class being invoked after other methods of the same software class.

2. The method according to claim 1, wherein said associating to each fitting source code element in the list an indication of the respective fitting probability includes sorting the fitting source code elements in the list by decreasing fitting probability.

3. The method according to claim 1, wherein said fitting probability is determined based on a statistical analysis of previously created pieces of source code.

4. The method according to claim 3, wherein said fitting probability expresses the probability that, considering a sequence of at least two preceding source code elements in said piece of source code module under development and preceding the current inputting location, the respective source code element has to be inputted in the current inputting location.

5. The method according to claim 4, wherein said high-level programming language is an object-oriented language, and said source code elements include invocations of software methods exposed by software objects being instantiations of software classes.

6. The method according to claim 5, wherein said fitting probabilities include probabilities of software methods of a software class being invoked after software methods of another software class.

7. The method according to claim 4, wherein said at least two preceding source code elements are invocations of software methods exposed by software objects being instantiations of software classes.

8. The method of claim 1, further comprising:
    accessing a database that comprises affinity data regarding semantical affinities among said fitting source code elements.

9. The method of claim 1, using said fitting probabilities to predict a next software method to follow a current software method at said current user inputting location.

10. A system for assisting a user in creating source code for a computer program in a high-level programming language, comprising a processor coupled to a memory including instructions that are executable by the processor to perform steps of:
    at a current user inputting location within a piece of said source code under development, detecting a need for assisting the user with input for the creation of the piece of source code;
    determining fitting source code elements suitable for input at said current inputting location; and
    providing to the user said list of fitting source code elements, wherein said determining includes determining for each fitting source code element a respective fitting probability of the source code element in the current inputting location, and wherein said providing includes associating to each fitting source code element in the list an indication of the respective fitting probability, wherein said fitting probabilities include probabilities of software methods of a software class being invoked after other methods of the same software class.

11. The system of claim 10, further comprising:
    accessing a database that comprises affinity data regarding semantical affinities among said fitting source code elements.

12. The system of claim 10, using said fitting probabilities to predict a next software method to follow a current software method at said current user inputting location.

13. A computer program product including a tangible computer readable storage device comprising instructions stored thereon for carrying out the steps of a method for assisting a user in creating source code for a computer program in a high-level programming language when the computer program is executed on a data processing system, the method including the steps of:

detecting a need for assisting the user with input for the creation of a piece of said source code at a current user inputting location within the piece of said source code;

determining fitting source code elements suitable for input at said current inputting location; and providing to the user said list of fitting source code elements, wherein for each fitting source code element a respective fitting probability of the source code element in the current inputting location is determined, and wherein to each fitting source code element in the list is associated with an indication of the respective fitting probability, wherein said fitting probabilities include probabilities of software methods of a software class being invoked after other methods of the same software class.

14. The computer program product of claim 13, further comprising:

accessing a database that comprises affinity data regarding semantical affinities among said fitting source code elements.

15. The computer program product of claim 13, using said fitting probabilities to predict a next software method to follow a current software method at said current user inputting location.

* * * * *